3,225,083
DIMERIZATION PROCESS OF PREPARING 1,4-DICYANO-1-BUTENE FROM ACRYLONITRILE
James D. McClure, San Francisco, Calif., assignor to Shell Oil Company, New York, N.Y., a corporation of Delaware
No Drawing. Filed Aug. 15, 1963, Ser. No. 302,474
15 Claims. (Cl. 260—465.8)

This invention relates to a novel process for the dimerization of acrylonitrile. More particularly, it relates to a process for the production of a linear non-branched acrylonitrile dimer.

Methods are available for the production of acrylonitrile dimers. Thermal dimerization of acrylonitrile is reported, J. Am. Chem. Soc., 71, 324 (1949), to produce a mixture of cyclic dimers, cis- and trans-1,2-dicyanocyclobutane. Schreyer, U.S. 2,609,385, discloses an indirect method for the production of 3-methyleneglutaronitrile, which compound is isomeric with an acrylonitrile dimer. More recently it has been found that acrylonitrile is dimerized in the presence of tertiary phosphine catalysts to produce 2-methyleneglutaronitrile, as is disclosed in applicant's copending application U.S. Serial No. 259,428, filed February 18, 1963. While such compounds are useful, it would be of considerable advantage to provide a linear, non-branched acrylonitrile dimer having a continuous chain of 6 carbon atoms.

It is the object of this invention to provide an improved method for the production of an acrylonitrile dimer. More particularly, it is an object of this invention to provide a process for the production of a linear, non-branched acrylonitrile dimer. A specific object is to provide an improved process for the production of 1,4-dicyano-1-butene.

It has now been found that these objects are accomplished by the process of dimerizing acrylonitrile in the presence of certain aromatic tertiary phosphine catalysts. When acrylonitrile is dimerized in the presence of aliphatic tertiary phosphine, 2-methyleneglutaronitrile is produced as a major product. In the presence of the particular catalysts of this invention, however, unexpectedly high yield of 1,4-dicyano-1-butene are also obtained.

The catalysts that have been found to be suitable in the process of this invention are tertiary aromatic phosphines, particularly tertiary aromatic mono-phosphines and tertiary aromatic diphosphines. Satisfactory catalysts are hydrocarbon phosphines, that is, contain only atoms of carbon, hydrogen and phosphorus and are further characterized by at least two monovalent substituents upon each phosphorus moiety which are aryl, preferably mononuclear aryl, which term is herein considered to include alkyl-substituted aryl, i.e., alkaryl, and any aliphatic substituents are divalent radicals connecting phosphorus atoms and are hydrocarbon aliphatic, preferably alkylene, having from 2 to 3 carbon atoms. All phosphorus moieties have at least two monovalent hydrocarbon aryl substituents, and, of course, in the case of tertiary aromatic mono-phosphines, possess three such substituents, no aliphatic moieties being present. The tertiary aromatic di-phosphine catalysts of the invention therefore possess two monovalent hydrocarbon aryl substituents on each phosphorus moiety, and one phosphorus-connecting divalent radical which if aliphatic is hydrocarbon aliphatic having from 2 to 3 carbon atoms. When other tertiary phosphines are employed, e.g., phosphines wherein the monovalent substituents are alkyl or are aryl containing non-hydrocarbyl substituents such as halogen, alkoxy or dialkylamino, or when the phosphorus-connecting radical, if aliphatic, has other than 2 to 3 carbon atoms, e.g., when the phosphorus-connecting radical is methylene or tetramethylene, inferior results are obtained, the relative percentage of the desired 1,4-dicyano-1-butene and/or the yield of dimeric product being reduced.

Preferred phosphine catalysts are represented by the formula RRRP wherein each R represents mononuclear hydrocarbon aryl or alkaryl, as well as by the formula RRP-R'-PRR wherein R has the previously stated significance, and R' may be a divalent radical corresponding to R, but preferably is aliphatic, particularly α,ω-alkylene, having 2 to 3 carbon atoms.

Preferred R groups in the above-depicted formulas are mononuclear hydrocarbon aryl or alkaryl radicals having up to 20 carbon atoms, preferably up to 10 carbon atoms, which radicals have from 0 to 5, preferably 0 to 2, alkyl substituents upon the aryl nucleus, each alkyl having from 1 to 8 carbon atoms. Illustrative of such R groups are phenyl, tolyl, xylyl, cumyl, p-ethylphenyl, m-propylphenyl, p-octylphenyl, o-ethylphenyl, 3,4-dibutylphenyl and 2,4,6-trimethylphenyl. Particularly preferred R groups are phenyl and tolyl, especially p-totyl.

Exemplary tertiary mono-phosphines include triphenylphosphine, tri(p-tolyl)phosphine, tri(p-ethylphenyl)phosphine, tri(m-butylphenyl)-phosphine, diphenyl-p-tolylphosphine, di(m-propylphenyl)phenylphosphine, tri(2,4-dimethylphenyl)phosphine and di(2,4-dimethylphenyl)-phenylphosphine, while illustrative tertiary di-phosphines include 1,2-bis(diphenyl-phosphino)ethane, 1,3-bis(diphenylphosphino)propane, 1,2-bis[di(4-tolyl)phosphino]-ethane, 2-(diphenylphosphino)ethyl - di-(4-tolyl)-phosphine, 3-[di-(3-ethylphenyl)phosphino]propyldiphenylphosphine, 1,4-bis(diphenylphosphino)benzene and 1,3-bis(ditolylphosphino)benzene.

The tertiary phosphine is employed in catalytic amounts. The optimum amount of phosphine employed will depend upon the particular catalyst utilized and the conditions of the reaction. In general, molar amounts of catalyst from about 0.0001 mole to about 0.1 mole per mole of acrylonitrile are satisfactory, although amounts of catalyst from about 0.001 mole to about 0.01 mole per mole of acrylonitrile are preferred.

The dimerization process of the invention is conducted in liquid phase solution. Solvents that are suitable are liquid at reaction pressure and temperature and are substantially inert towards addition to or reaction with the unsaturated linkage of the acrylonitrile reactants or the dimer product. Although solvents such as esters, ethers, saturated nitriles and the like are in part operable, preferred solvents are hydroxylic. The role of the solvent in the dimerization process is not clearly understood, but it is believed that a hydroxylic solvent serves as a source of hydrogen ions which effectively inhibit the formation and propagation of polymer chains normally associated with reactions of readily polymerizable materials at elevated temperatures. Although such hydroxylic solvents as primary and secondary alcohols are operable in the process of the invention, these hydroxylic solvents have a tendency to undergo addition across the olefinic linkage of the unsaturated reactant, and the advantages obtained by the use of such solvents are somewhat offset by the side reaction of solvent addition. Best results are obtained when the hydroxylic solvent is tertiary, that is, the hydroxyl group is attached to an atom to which are attached three organic substituents. Preferred solvents of this type are represented by the formula

wherein A is a member of Group IV of the Periodic Table having an atomic number of 6 to 14, that is, the atoms carbon and silicon, and R″ is hydrocarbyl, preferably alkyl having 1 to 10 carbon atoms, particularly alkyl having 1 to 4 carbon atoms. The preferred tertiary hydroxylic solvents therefore comprise a carbon or silicon atom possessing three alkyl substituents and one hydroxyl substituent, i.e., a trialkyl carbinol or a trialkylsilicol. Illustrative tertiary hydroxylic solvents include tertiary butyl alcohol, tertiary amyl alcohol, triethyl carbinol, propyl diethyl carbinol, tri-n-butyl carbinol, triethylsilicol, tripropylsilicol, dibutylmethylsilicol and the like.

The optimum amount of solvent will be dependent upon the particular tertiary hydroxylic compound that is employed. In general, molar ratios of solvent to acrylonitrile from about 1:6 to about 6:1 are satisfactory. When the tertiary hydroxylic solvent is an alcohol, molar ratios of solvent to acrylonitrile from about 1:2 to about 3:1 are preferred, although when a tertiary silicol is employed as solvent, molar ratios of solvent to acrylonitrile from about 1:1 to about 1:5 are preferred.

The tertiary hydroxylic solvent is employed as a single substance or may be employed as a mixture with inert diluents such as ethers, esters or hydrocarbons. Although the presence of an inert diluent does not appear to be detrimental, neither does it appear to offer a substantial advantage, and in the preferred modification of the process of the invention, the hydroxylic solvent is substantially free from other diluents.

The dimerization process is preferably conducted in an inert atmosphere, e.g., under an inert gas such as nitrogen, helium or argon, and is preferably conducted under substantially anhydrous conditions. Although small amounts of water, e.g., up to about 1–2% of the reaction mixture, may be tolerated without losing the advantages of the process of the invention, the yields of product are somewhat lower when moisture is present. The reactants, catalyst and solvent are customarily charged to an autoclave or similar reactor, sealed, and maintained at reaction temperature during reaction time, typically from about 3 to about 12 hours, and the reaction mixture is customarily agitated as by shaking or stirring. Suitable reaction temperatures will be dependent upon the particular catalyst and solvent employed. While the dimerization process may be conducted at temperatures as low as about 80° C. or as high as about 250° C., reaction temperatures from about 100° C. to about 200° C. are preferred. The dimerization may be conducted at atmospheric, subatmospheric or superatmospheric pressure, although pressures that are substantially atmospheric are preferred. Advantageous use is made of the pressures generated by the reaction mixture when heated to reaction temperature in a sealed reactor, which pressures will be somewhat but not substantially higher than atmospheric pressure.

Subsequent to reaction, the reaction mixture is cooled, and the product mixture is recovered and separated by conventional means, as by fractional distillation of the product mixture following removal of solvent and unreacted starting material which may then be recycled. Best results are obtained when the catalyst is deactivated, as by neutralization with an acid, which may be organic or inorganic, e.g., acetic acid, prior to distillation of the product mixture. The dimer mixture that is obtained as product is separated by such means as molecular sieve separation, selective extraction or selective adsorption, particularly a selective gas-liquid adsorption on a material such as carbowax on fluoropak.

The products of the process of the invention are acyclic acrylonitrile dimers. While the major product is a branched isomer, i.e., 2-methyleneglutaronitrile, substantial proportions of the non-branched isomer, 1,4-dicyano-1-butene are obtained when the aromatic teritary phosphine catalysts of the invention are employed. Numerous utilities are available for the 1,4-dicyano-1-butene because of the continuous chain of six carbon atoms which are not available for the branched isomer. Among these utilities is the use as an intermediate in the production of adiponitrile and hexamethylenediamine, as well as various adipic acid derivatives. Additionally, the 1,4-dicyano-1-butene is epoxidized to 1,4-dicyano-1,2-epoxybutane, which is a useful chemical intermediate, or may serve as an epoxy resin precursor.

To further illustrate the process of the invention, the following examples are provided. It should be understood that they are not to be regarded as limitations, as the teachings thereof may be varied as will be understood by one skilled in the art.

*Example I*

To a glass-lined reactor was charged 40 g. of acrylonitrile, 0.1 g. hydroquinone, 1 g. of tri(p-tolyl)phosphine and 100 g. of tertiary butyl alcohol. The reaction mixture was maintained under nitrogen at 161±1° C. for 8 hours. The solvent and unreacted starting material were removed by distillation at reduced pressure subsequent to neutralization with 0.3 g. acetic acid. The residual liquid, 6.8 g., was fractionally distilled to give 4.4 g. of dimeric product, B.P. 60–100° C. at 0.1 mm., which represented a 74% yield based upon a 15% conversion. Gas-liquid chromatography indicated the product contained 67% 2-methyleneglutaronitrile, 24% trans-1,4-dicyano-1-butene, and 9% cis-1,4-dicyano-1-butene.

*Example II*

To a glass-lined reactor was charged 40 g. of acrylonitrile, 0.1 g. hydroquinone, 1 g. of tri-(p-tolyl)phosphine,, and 80 g. of triethylsilicol. The reaction mixture was maintained under nitrogen for 8 hours at 155±2° C. The product mixture was neutralized with 0.2 g. acetic acid and filtered to remove 0.5 g. of insoluble material, the transfer being effected by the addition of benzene. The benzene and unreacted starting material were removed, and upon cooling, the mixture separated into two phases, the upper phase being 99% solvent and 1% dimer. The lower phase, 16 g., was fractionally distilled to give 9.5 g. dimeric product, B.P. 60–100° C. at 0.2 mm. The total dimer yield was 85% based upon a 30% conversion. Gas-liquid chromatographic analysis indicated the dimer mixture contained 69% 2-methyleneglutaronitrile, 16% trans-1,4-dicyano-1-butene and 15% cis-1,4-dicyano-1-butene.

When this procedure was repeated using 100 g. of triethylsilicol as solvent and a temperature of 150° C., an 87% yield of dimer, based upon a 15% conversion, was obtained, which contained 63% 2-methyleneglutaronitrile, 19% trans-1,4-dicyano-1-butene and 18% cis-1,4-dicyano-1-butene.

*Example III*

To a glass-lined reactor was charged 40 g. of acrylonitrile, 0.1 g. of hydroquinone, 1 g. of triphenylphosphine and 100 g. of tertiary 30 butyl alcohol. The reaction mixture was maintained at 191±1° C. for 8 hours, then neutralized with 0.3 g. of acetic acid and filtered. The solvent and unreacted starting material were removed under reduced pressure to give a 40% yield of dimeric product based upon an 8% conversion. The dimer mixture contained 59% 2-methyleneglutaronitrile, 30% trans-1,4-dicyano-1-butene and 11% cis-1,4-dicyano-1-butene.

*Example IV*

When the procedure of Example III was repeated using diphenyloctylphosphine as catalyst and a reaction temperature of 100° C., a 60% yield of dimer, based upon a 33% conversion, was obtained. This dimer mixture contained 99% 2-methyleneglutaronitrile and 1% 1,4-dicyano-1-butene. Utilization of tris(p-dimethyl-aminophenyl)phosphine as catalyst afforded a 76% yield of dimeric product, based upon a 35% conversion, which contained 99.5% 2-methyleneglutaronitrile and 0.5% 1,4-dicyano-1-butene. When tri-n-butylphosphine was employed as catalyst under similar reaction conditions, a 72% yield of dimer mixture was obtained, based upon a 25% conversion, which contained 98% 2-methyleneglutaronitrile and 2% 1,4-dicyano-1-butene.

*Example V*

To a glass-lined reactor was charged 240 g. of acrylonitrile, 3.0 g. of 1,2-bis(diphenylphosphino)ethane, 0.2 g. of hydroquinone and 600 g. of tertiary butyl alcohol. The reaction mixture was maintained under nitrogen at 140±7° C. for a period of 8 hours. The product mixture was diluted with benzene, filtered, and neutralized with 0.7 g. of acetic acid. The solvent and unreacted starting material were removed by distillation under reduced pressure, and the residual liquid was distilled to afford 10 g. of dimer product, B.P. 65–78° C. at 0.1 mm., which represented a 70% yield based upon converted acrylonitrile. The dimer mixture was found to be composed of 81% 2-methyleneglutaronitrile, 16% trans-1,4-dicyano-1-butene and 3% cis-1,4-dicyano-1-butene.

*Example VI*

A mixture of 40 g. of acrylonitrile, 1.5 g. of 1,3-bis-(diphenylphosphino)propane, 0.05 g. of hydroquinone and 100 g. of tertiary butyl alcohol was maintained under nitrogen at 135±3° C. for 7 hours. The product mixture was filtered, and the solvent and unreacted starting material were removed by distillation under reduced pressure. Distillation of the residual liquid afforded 9.7 g. of dimeric product, B.P. 60–78° C. at 0.2 mm., which represented a 69% yield of dimer based upon a 35% conversion. Gas-liquid chromatography disclosed the dimer mixture to be 81% 2-methyleneglutaronitrile, 14% trans-1,4-dicyano-1-butene and 5% cis-1,4-dicyano-1-butene.

*Example VII*

When the procedure of Example VI was followed, except that bis(diphenylphosphine)methane was employed as catalyst, a 76% yield of dimer was obtained which contained 99% 2-methyleneglutaronitrile and 1% 1,4-dicyano-1-butene. In a similar manner, when 1,4-bis-(diphenylphosphino)butane was employed as catalyst, a 58% yield of dimer product was obtained, which contained 98.5% 2-methyleneglutaronitrile and 1.5% 1,4-dicyano-1-butene. In a similar experiment at 175° C., tetraphenyldiphosphine was inactive as a catalyst, no dimeric product being formed.

Utilization of 1,2-bis(dimethylphosphino)ethane as catalyst under conditions similar to Example V, afforded a 60% yield of dimeric product which contained 96.5% 2-methyleneglutaronitrile.

*Example VIII*

To a glass-lined reactor was charged 40 g. of acrylonitrile, 0.1 g. of hydroquinone, 1 g. of triphenylphosphine and 40 g. of triethylsilicol. The reaction mixture was maintained at 180±1° C. for 8 hours during which time no significant polymer formation was observed. The product mixture was transferred from the reactor with benzene and benzene and unreacted starting material were removed. Upon cooling, two layers formed, the upper layer consisting of 98.5% triethylsilicol and 1.5% dimer. The lower layer was fractionally distilled to afford 3.1 g. of dimer product, B.P. 65–95° C. at 0.2 mm. The total yield of dimer was 75% based on a 13% conversion of acrylonitrile. The dimer mixture contained 60% 2-methyleneglutaronitrile, 27% trans-1,4-dicyano-1-butene and 13% cis-1,4-dicyano-1-butene.

*Example IX*

The procedure of Example VIII was repeated, except that 1.8 g. of 1,4-bis(diphenylphosphino)benzene was employed as catalyst and the reaction was conducted at 176±2° C. for 10.5 hours. A total of 5 grams of dimeric product, a 75% yield based upon a 17% conversion, was obtained which contained 58% 2-methyleneglutaronitrile, 23% trans-1,4-dicyano-1-butene and 19% cis-1,4-dicyano-1-butene.

I claim as my invention:

1. The process for the production of 1,4-dicyano-1-butene by dimerizing acrylonitrile in the presence of from about 0.0001 mole to about 0.1 mole per mole of acrylonitrile of a tertiary aromatic phosphine catalyst of only atoms of carbon, hydrogen and phosphorus selected from the group consisting of RRRP and RRP—R'—RRP wherein R is selected from the group consisting of monovalent hydrocarbon aryl of up to 20 carbon atoms and monovalent hydrocarbon alkaryl of up to 20 carbon atoms and R' is selected from the group consisting of divalent hydrocarbon aryl of up to 20 carbon atoms, divalent hydrocarbon alkaryl of up to 20 carbon atoms and divalent saturated aliphatic hydrocarbon moiety of 2 to 3 carbon atoms, in substantially anhydrous tertiary hydroxylic solvent of the formula

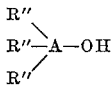

wherein A is selected from the group consisting of carbon and silicon and R" is alkyl of 1 to 10 carbon atoms, at a temperature of from about 100° C. to about 200° C.

2. The process of claim 1 wherein the catalyst is 1,2-bis(diphenylphosphino)ethane.

3. The process of claim 1 wherein the catalyst is 1,3-bis(diphenylphosphino)propane.

4. The process of claim 1 wherein the cataylst is 1,4-bis(diphenylphosphino)benzene.

5. The process for the production of 1,4-dicyano-1-butene by dimerizing acrylonitrile in the presence of from about 0.0001 mole to about 0.1 mole per mole of acrylonitrile of triarylphosphine catalyst of only atoms of carbon, hydrogen and phosphorus, wherein each aryl is monovalent hydrocarbon aryl of up to 10 carbon atoms, in substantially anhydrous trialkyl carbinol solvent wherein each alkyl is alkyl of 1 to 10 carbon atoms, at a temperature of from 100° to 200° C.

6. The process of claim 5 wherein the catalyst is triphenylphosphine.

7. The process of claim 5 wherein the trialkyl carbinol is tertiary butyl alcohol.

8. The process of claim 5 wherein the trialkyl carbinol is tertiary amyl alcohol.

9. The process for the production of 1,4-dicyano-1-butene by dimerizing acrylonitrile in the presence of from about 0.0001 mole to about 0.1 mole per mole of acrylonitrile of triarylphosphine catalyst of only atoms of carbon, hydrogen and phosphorus, wherein each aryl is monovalent hydrocarbon aryl of up to 10 carbon atoms, in substantially anhydrous trialkylsilicol solvent wherein each alkyl is alkyl of 1 to 10 carbon atoms at a temperature of from 100° C. to 200° C.

10. The process of claim 9 wherein the solvent is triethylsilicol.

11. The process of claim 9 wherein the solvent is tripropylsilicol.

12. The process for the production of 1,4-dicyano-1-butene by dimerizing acrylonitrile in the presence of from about 0.0001 mole to about 0.1 mole per mole of acrylonitrile of tri(alkaryl)phosphine catalyst of only atoms of carbon, hydrogen and phosphorus, wherein each alkaryl is monovalent hydrocarbon alkaryl of up to 10 carbon atoms, is substantially anhydrous trialkyl carbinol solvent wherein each alkyl is alkyl of 1 to 10 carbon atoms, at a temperature of from 100° C. to 200° C.

13. The process of claim 12 wherein the catalyst is tri(p-tolyl)phosphine.

14. The process of claim 12 wherein the trialkyl carbinol is tertiary butyl alcohol.

15. The process for the production of 1,4-dicyano-1-butene by dimerizing acrylonitrile in the presence of from about 0.0001 mole to about 0.1 mole per mole of acrylonitrile of tri(alkaryl)phosphine catalyst of only atoms of carbon, hydrogen and phosphorus, wherein each alkaryl is monovalent hydrocarbon alkaryl of up to 10 carbon atoms, in substantially anhydrous trialkylsilicol solvent wherein each alkyl is alkyl of 1 to 10 carbon atoms, at a temperature of from 100° C. to 200° C.

References Cited by the Examiner

UNITED STATES PATENTS 2,540,736   2/1951   Kalb et al. _____ 260—465.3 X

OTHER REFERENCES

Takashina et al.: J.A.C.S., 84, February 5, 1962, pages 489–491.

CHARLES B. PARKER, *Primary Examiner*.